(12) United States Patent
Chung

(10) Patent No.: US 8,907,257 B2
(45) Date of Patent: Dec. 9, 2014

(54) CONTACTLESSLY CHARGEABLE HEATER

(75) Inventor: Gi Soo Chung, Gyeonggi-do (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 195 days.

(21) Appl. No.: 13/322,585

(22) PCT Filed: Dec. 29, 2010

(86) PCT No.: PCT/KR2010/009484
§ 371 (c)(1),
(2), (4) Date: Nov. 28, 2011

(87) PCT Pub. No.: WO2011/136461
PCT Pub. Date: Nov. 3, 2011

(65) Prior Publication Data
US 2013/0032589 A1     Feb. 7, 2013

(30) Foreign Application Priority Data

Apr. 26, 2010 (KR) .......... 10-2010-0038390

(51) Int. Cl.
*H05B 6/00* (2006.01)
*H05B 6/10* (2006.01)
(Continued)

(52) U.S. Cl.
CPC .............. *H05B 3/347* (2013.01); *H02J 7/025* (2013.01); *H01F 38/14* (2013.01); *H05B 2203/015* (2013.01)
USPC ........... 219/618; 219/645; 219/601; 219/635; 219/660; 219/672; 219/600; 219/636; 219/662; 219/663; 219/675; 219/676; 180/218; 180/219; 4/596; 4/598; 4/599; 4/612

(58) Field of Classification Search
CPC ......... H02J 7/025; H01F 38/14; H05B 3/347; H05B 2203/015
USPC ................ 219/618, 645, 601, 635, 660–677; 180/218–231; 4/596–614
See application file for complete search history.

(56) References Cited

U.S. PATENT DOCUMENTS 2,543,882 A * 3/1951 Tice .............................. 219/618
2,717,949 A * 9/1955 Challenner ................... 219/618
(Continued)

FOREIGN PATENT DOCUMENTS

CN      2588808     12/2003
CN      2666013     12/2004
(Continued)

OTHER PUBLICATIONS

International Search Report mailed Sep. 1, 2011 for PCT/KR2010/009484.
(Continued)

*Primary Examiner* — Dana Ross
*Assistant Examiner* — Gyounghyun Bae

(57) ABSTRACT

The present invention relates to a contactlessly chargeable heater. In one example, the contactlessly chargeable heater includes: an induction patch emitting magnetic field by means of current applied to an inner coil; and a heating body, receiving the magnetic field from the charging patch to perform a contactless charging operation, and including a conductive metal yarn for emitting heat via the power generated through the contactless charging operation. The conductive metal yarn is woven together using threads within the heating body.

18 Claims, 4 Drawing Sheets

(51) Int. Cl.
  *H05B 6/02* (2006.01)
  *H05B 6/04* (2006.01)
  *H05B 6/36* (2006.01)
  *H05B 6/06* (2006.01)
  *B62D 61/00* (2006.01)
  *B62D 61/02* (2006.01)
  *A47K 3/022* (2006.01)
  *A47K 3/00* (2006.01)
  *H05B 3/34* (2006.01)
  *H02J 7/02* (2006.01)
  *H01F 38/14* (2006.01)

(56) References Cited

U.S. PATENT DOCUMENTS

| | | | | |
|---|---|---|---|---|
| 3,427,421 A * | 2/1969 | Clune et al. | | 219/634 |
| 3,960,629 A * | 6/1976 | Goldsworthy | | 156/180 |
| 4,674,199 A * | 6/1987 | Lakic | | 36/2.6 |
| 4,788,394 A * | 11/1988 | Vanneste et al. | | 219/636 |
| 4,871,412 A * | 10/1989 | Felix et al. | | 156/273.9 |
| 5,140,131 A * | 8/1992 | Macher et al. | | 219/211 |
| 5,182,427 A * | 1/1993 | McGaffigan | | 219/663 |
| 5,313,034 A * | 5/1994 | Grimm et al. | | 219/765 |
| 5,620,621 A * | 4/1997 | Sontag | | 219/211 |
| 5,956,866 A * | 9/1999 | Spears | | 36/2.6 |
| 5,977,517 A * | 11/1999 | Grosjean | | 219/211 |
| 6,049,658 A * | 4/2000 | Schave et al. | | 392/472 |
| 6,346,690 B1 * | 2/2002 | Ulrich et al. | | 219/635 |
| 7,145,116 B2 * | 12/2006 | Keishima et al. | | 219/672 |
| 7,211,774 B2 * | 5/2007 | Chen et al | | 219/634 |
| 7,816,632 B2 * | 10/2010 | Bourke et al. | | 219/635 |
| 2007/0000912 A1 * | 1/2007 | Aisenbrey | | 219/528 |
| 2007/0055330 A1 * | 3/2007 | Rutherford | | 607/114 |
| 2007/0250981 A1 * | 11/2007 | Seibert | | 2/69 |
| 2007/0263699 A1 * | 11/2007 | Clothier et al. | | 374/163 |
| 2008/0164247 A1 * | 7/2008 | Chen et al. | | 219/601 |
| 2008/0169134 A1 * | 7/2008 | Tomolillo et al. | | 180/6.24 |
| 2008/0197126 A1 * | 8/2008 | Bourke et al. | | 219/634 |
| 2009/0273311 A1 * | 11/2009 | Beers et al. | | 320/108 |
| 2010/0006562 A1 * | 1/2010 | Clothier | | 219/494 |
| 2010/0071984 A1 * | 3/2010 | Doi et al. | | 180/218 |
| 2011/0018498 A1 * | 1/2011 | Soar | | 320/108 |
| 2011/0130060 A1 | 6/2011 | Chung et al. | | |

FOREIGN PATENT DOCUMENTS

| | | |
|---|---|---|
| CN | 101641026 | 2/2010 |
| KR | 10-1998-0065455 A | 10/1998 |
| KR | 10-0171915 B1 | 2/1999 |
| KR | 10-2004-0033446 | 4/2004 |
| KR | 10-2004-0033466 A | 4/2004 |
| KR | 10-2009-0125656 A | 12/2009 |

OTHER PUBLICATIONS

Written Opinion of the International Search Report mailed Sep. 1, 2011 for PCT/KR2010/009484.

Chinese Office Action dated Mar. 4, 2013 corresponding to Chinese Patent Application No. 201080022945.3.

* cited by examiner

CONTACTLESSLY CHARGEABLE HEATER

This application claims the priority of Korean Patent Application No. 10-2010-0038390, filed on Apr. 26, 2010 in the KIPO (Korean Intellectual Property Office), the disclosure of which is incorporated herein entirely by reference. Further, this application is the National Stage application of International Application No. PCT/KR2010/009484, filed Dec. 29, 2010, which designates the United States and was published in Korean. Each of these applications is hereby incorporated by reference in their entirety into the present application.

TECHNICAL FIELD

The present invention relates to a contactlessly chargeable heater.

BACKGROUND ART

When a user moves outdoors using a motorcycle or a bicycle, the user comes into contact with the outside air. However, the outside air, which is cold particularly in winter, may become an impediment to moving the vehicle such as the motorcycle or the bicycle. In some case, it is also necessary to warm a human body by transfer heat to the human body. In order to transfer heat to the human body, the heat is generated by applying a current to an electric wire. In this case, however, it is important to insulate the current so as not to be exposed to the human body.

DISCLOSURE OF INVENTION

Technical Problem

The present invention relates to a contactlessly chargeable heater.

Technical Solution

According to an embodiment of the present invention, a heating apparatus is provided, including an induction patch generating a magnetic field when a current flows in an internal coil, and a heating element receiving the magnetic field from the induction patch to perform non-contacting charging and having conductive metal yarns generating heat using charged power, wherein the conductive metal yarns are woven within the heating element with a fabric.

The induction patch may receive power from a battery and apply a current to the internal coil. In a case where the battery is a DC power supply, a converter for converting DC power into AC power is additionally necessary.

One end of each of the conductive metal yarn is in the form of a coil to receive the magnetic field from the induction patch.

The conductive metal yarns form part of at least one of warps and wefts for weaving the heating element.

The induction patch is used to form a saddle of a motorcycle and the heating element is woven to produce motorcycle rider's clothes.

The induction patch may form a chair and the heating element may be woven to produce chair user's clothes.

The induction patch may be used to form a handle of a bicycle and the heating element may be woven to produce gloves for a bicycle rider.

The induction patch may be used to form a curtain rod of a curtain and the heating element may be woven to produce curtain.

The heating apparatus may further include a temperature sensing unit attached to a surface of the heating element and having a bimetal or thermistor for sensing the temperature of the heating element.

The heating apparatus may further include a variable resistor provided within the heating element, and a controller controlling an amount of the current flowing in the conductive metal yarns by adjusting the size of the variable resistor.

Advantageous Effects

As described above, in the heating apparatus according to the present invention including a patch and a heating element formed using conductive metal yarns, the heating element can be charged by the induction patch in a non-contacting manner, thereby increasing user's convenience.

In addition, in the heating apparatus according to the present invention, the conductive metal yarns in the heating element generate heat using charged power, and the heating element easily transfers the heat to a user.

BEST MODE FOR CARRYING OUT THE INVENTION

Hereinafter, embodiments of the present invention will be described in detail with reference to the accompanying drawings such that they can easily be made and used by those skilled in the art.

A configuration of a heating apparatus according to an embodiment of the present invention will now be described with reference to the accompanying drawings.

Figure 1:
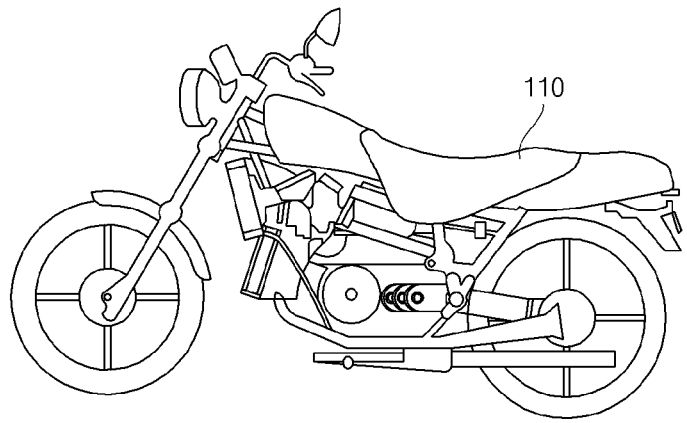
FIG. 1 illustrates an induction patch of a heating apparatus according to an embodiment of the present invention.
Figure 2:
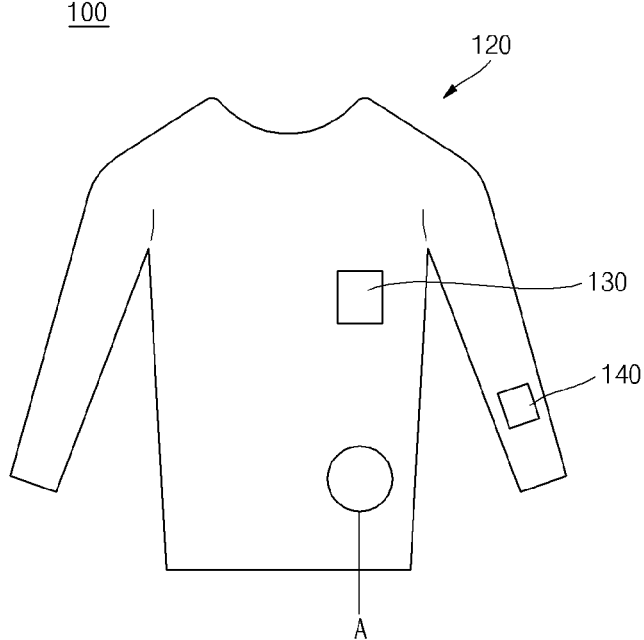
FIG. 2 illustrates a heating element of a heating apparatus according to an embodiment of the present invention.
Figure 3:
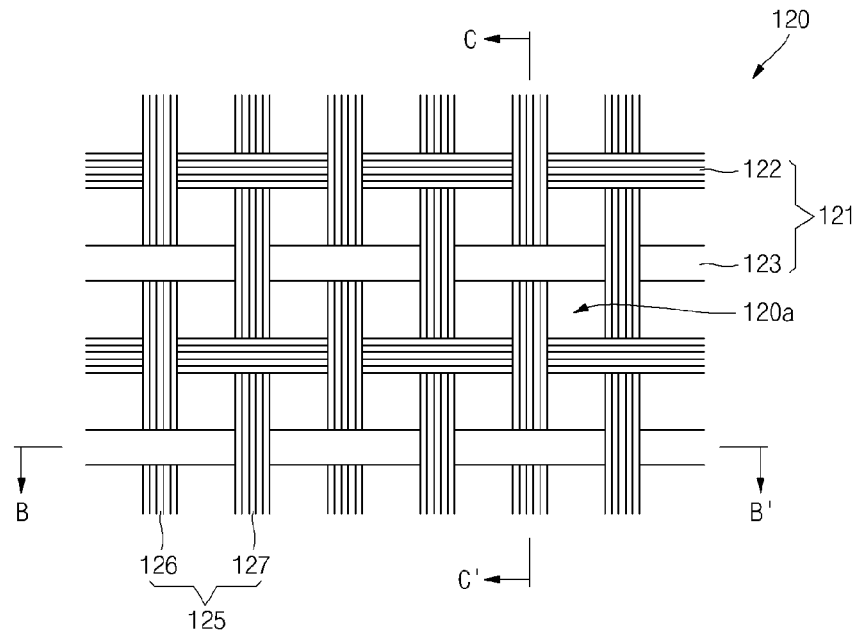
FIG. 3 is a partly enlarged view of an 'A' portion of FIG. 2.
Figure 4:
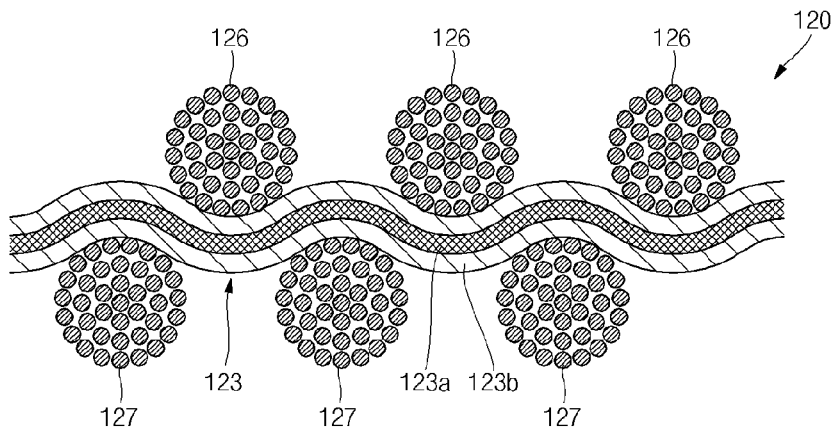
FIG. 4 is a cross-sectional view taken along the line B-B' of FIG. 3.
Figure 5:
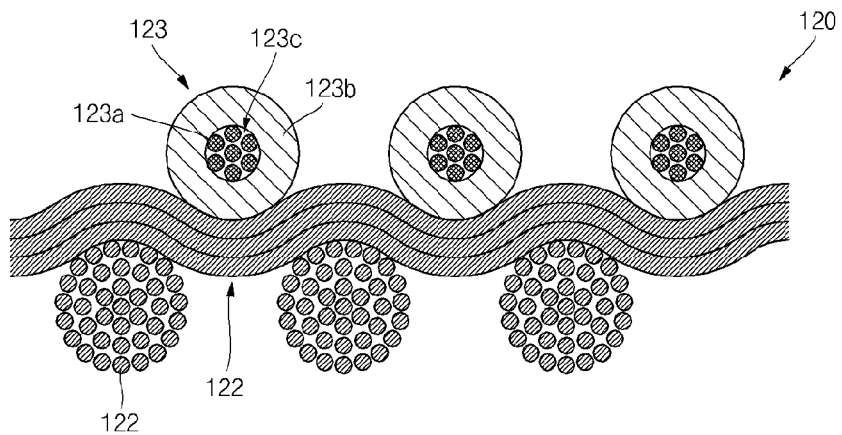
FIG. 5 is a cross-sectional view taken along the line C-C' of FIG. 3.
Figure 6:
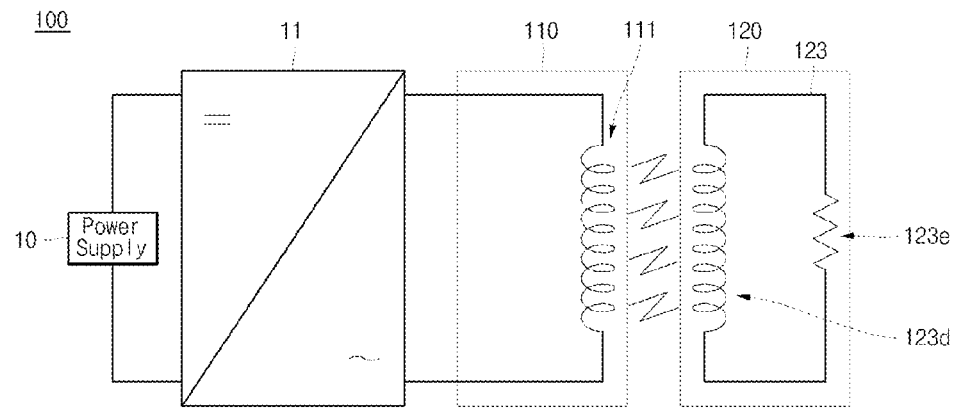
FIG. 6 is a circuit diagram illustrating operations of the induction patch and the heating element of the heating apparatus according to an embodiment of the present invention.
Figure 7:
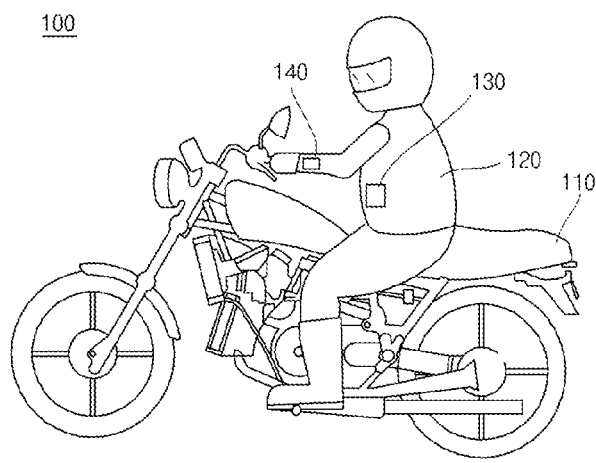
FIG. 7 illustrates a state in which the induction patch and the heating element of the heating apparatus according to an embodiment of the present invention are combined to each other.

FIG. 1 illustrates an induction patch of a heating apparatus according to an embodiment of the present invention, FIG. 2 illustrates a heating element of a heating apparatus according to an embodiment of the present invention, FIG. 3 is a partly enlarged view of an 'A' portion of FIG. 2, FIG. 4 is a cross-sectional view taken along the line B-B' of FIG. 3, FIG. 5 is a cross-sectional view taken along the line C-C' of FIG. 3, FIG. 6 is a circuit diagram illustrating operations of the induction patch and the heating element of the heating apparatus according to an embodiment of the present invention, and FIG. 7 illustrates a state in which the induction patch and the heating element of the heating apparatus according to an embodiment of the present invention are combined to each other.

Referring to FIGS. 1 to 7, the heating apparatus 100 according to an embodiment of the present invention includes an induction patch 110 and a heating element 120. The heating apparatus 100 may further include a temperature sensing unit 130 and a controller 140.

In the heating apparatus 100, the induction patch 110 may be formed as a saddle of a motorcycle. If a rider gets on the motorcycle equipped with the heating element 120, the induction patch 110 charges the heating element 120 to allow the heating element 120 to generate heat. The induction patch 110 incorporates an internal coil 111.

The induction patch 110 receives a current from an external or internal power supply 10 and applies the current to the internal coil 111. Here, in a case where the power supply 10 is a DC power supply, a converter 11 for converting DC power into AC power is additionally necessary.

The induction patch 110 charges the heating element 120 using a magnetic field generated when the current flows in the internal coil 111. In a state in which the heating element 120 is not in physical contact with the induction patch 110, the heating element 120 performs charging, specifically non-contacting charging. Thus, when the induction patch 110 charges the heating element 120, the heating element 120 ensures user's safety.

The heating element 120 performs non-contacting charging in link with the induction patch 110 and generates heat. The heating element 120 is shaped of a garment, specifically, the motorcycle rider's clothes. If the motorcycle rider wearing the heating element 120 gets on the motorcycle, the induction patch 110 charges the heating element 120. In addition, the heating element 120 generates heat using the charged power. Thus, the motorcycle rider receives the heat from the heating element 120 to achieve warming.

To this end, the heating element 120 includes warps 121 and wefts 125. The warps 121 and the wefts 125 are woven to produce the heating element 120. The warps 121 and the wefts 125 are woven to be perpendicular to each other and interlaced in a zigzag fashion to form the heating element 120.

The warps 121 are formed in parallel with each other in a first direction, and include a plurality of warps arranged at constant intervals in a second direction perpendicular to the first direction. The warps 121 include a plurality of general warps 122 and conductive metal yarns 123, which are arranged in the second direction.

The warps 122 are generally formed from yarns. Here, the yarns may mean threads constituting a fabric for making clothes. FIGS. 3 to 5 illustrate that the general warps 122 have a multi-filament structure formed by twisting multiple strands of yarns into a single yarn. However, the structure of the general warps 122 is not limited to the multi-filament structure, and may be formed as a single yarn.

The conductive metal yarns 123 are formed in the first direction and are arranged in parallel with the general warps 122. One end of the conductive metal yarn 123 is formed in the shape of a coil and performs charging using a magnetic field applied from the induction patch 110. The conductive metal yarns 123 generate heat using the charged power, thereby supplying heat to a user wearing the heating element 120. While the conductive metal yarns 123 constitute part of the warps 121 in the illustrated embodiment, they may be arranged to constitute part of the wefts 125 and the shapes of the conductive metal yarns 123 are not limited to those listed herein. Each of the conductive metal yarns 123 include one or more metal parts 123a centrally positioned based on the diameter of the conductive metal yarn 123, and a coating part 123b surrounding the metal parts 123a. In addition, a void 123c that is an empty space created between the metal parts 123a and the coating part 123b when the coating part 123b is not led into a region between the metal parts 123a. A cover yarn (not shown) surrounding the outer circumferential surface of the coating part 123b may further be formed.

The metal parts 123a are made of a metal having small electrical resistance and high resilience against repeated bending processes. The metal parts 123a may be formed of at least one selected from copper, a copper alloy, silver, a silver alloy, brass, and combinations thereof. In addition, while seven of the metal parts 123a are provided in the illustrated embodiment, aspects of the present invention are not limited thereto.

The coating part 123b is formed to surrounding the metal parts 123a. The coating part 123b prevents EMI from being transferred to human body while allowing heat generated from the metal parts 123a to be transferred to the human body. In addition, the coating part 123b prevents external noise electronic waves from being transferred to the metal parts 123a within the conductive metal yarns 123. To this end, the coating part 123b may be formed of at least one material selected from ethylenetetrafluoroethylene (ETFE), fluorinated ethylenepropylene (FEP), polytetrafluoroethylene (PTFE), polyvinylidenefluoride (PVDF), perfluoroalkoxy (PFA), and equivalents thereof, but aspects of the present invention are not limited thereto.

One end of each of the conductive metal yarns 123 has a coil 123d to perform non-contacting charging using a magnetic field generated from the internal coil 111 of the induction patch 110. In addition, if a current flows in the charged conductive metal yarn 123, heat is generated through a resistive component 123e. Thus, the conductive metal yarn 123 may transfer the heat to a rider wearing the heating element 120.

The wefts 125 include a plurality of wefts formed in a second direction perpendicular to the warps 121. The plurality of wefts 125 are arranged at constant intervals in the first direction and are positioned in parallel with each other. The wefts 125 and the warps 121 are woven together to form the heating element 120. Like the general warps 121, the wefts 125 may have a single yarn structure or a multi-filament structure.

The wefts 125 are divided into two groups according the rows in which they are arranged, the two groups including first wefts 126 and second wefts 127. The first wefts 126 and the second wefts 127 are arranged to be adjacent to each other. For example, the first wefts 126 are positioned at odd rows, and the second wefts 127 are positioned at even rows.

The temperature sensing unit 130 is formed on a portion of the surface of the heating element 120. The temperature sensing unit 130 senses the temperature of the heating element 120. In addition, the temperature sensing unit 130 transmits the sensed temperature to the controller 140. Thus, the temperature sensing unit 130 allows the motorcycle rider wearing the heating element 120 to perceive the temperature. The temperature sensing unit 130 may be formed using a bimetal or thermistor for sensing the temperature of the heating element. However, the present invention does not limit the kind of the temperature sensing unit 130 to those listed herein.

The controller 140 is attached at one side of the heating element 120. The controller 140 may control a temperature signal transmitted from the temperature sensing unit 130 to be displayed on a display, and may allow the motorcycle rider to control the temperature of the heating element 120. The controller 140 may control an amount of the current flowing through the conductive metal yarns 123 by adjusting the size of a variable resistor (not shown) provided in the heating element 120. Therefore, the controller 140 may control the temperature of the heating element 120.

As described above, the heating apparatus 100 includes the heating element 120 for producing motorcycle rider's clothes by weaving the induction patch 110 formed in the saddle of the motorcycle and the conductive metal yarns 123 to allow the induction patch 110 to perform non-contacting charging on the heating element 120, thereby facilitating user's convenience. In addition, the conductive metal yarns 123 generate heat using charged power, thereby easily transmitting heat to the motorcycle rider wearing the heating element 120.

A configuration of a heating apparatus according to another embodiment of the present invention will now be described with reference to the accompanying drawings. The same functional components as those of the previous embodiment are not separately illustrated, and the following description will focus on differences between the present embodiment and the previous embodiment.

Figure 8:
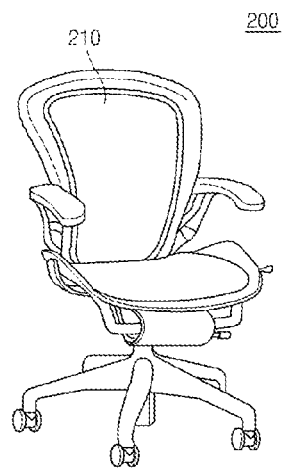
FIG. 8 illustrates an induction patch of a heating apparatus according to another embodiment of the present invention.

FIG. 8 illustrates an induction patch of a heating apparatus according to another embodiment of the present invention.

Referring to FIG. 8, the heating apparatus 200 according to another embodiment of the present invention includes an induction patch 210, and a heating element (not shown). The heating apparatus 200 according to another embodiment of the present invention may further include a temperature sensing unit (not shown) and a controller (not shown).

In the heating apparatus 200 according to another embodiment of the present invention, the induction patch 210 may be formed as a sheet of a chair. If a user with the heating element sits down on the chair, specifically, the induction patch 210, the induction patch 210 charges the heating element to allow the heating element to generate heat. To this end, the induction patch 210 incorporates an internal coil and applies a current from an external or internal power supply to the internal coil to generate a magnetic field. In addition, the heating element 120 and the induction patch 110 perform non-contacting charging. Thus, when the induction patch 110 charges the heating element 120, safety of the user with the heating element 120 can be facilitated.

Figure 9:
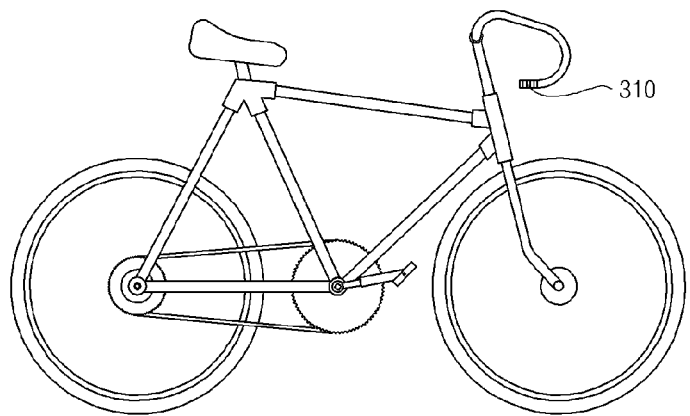
FIG. 9 illustrates an induction patch of a heating apparatus according to still another embodiment of the present invention.
Figure 10:
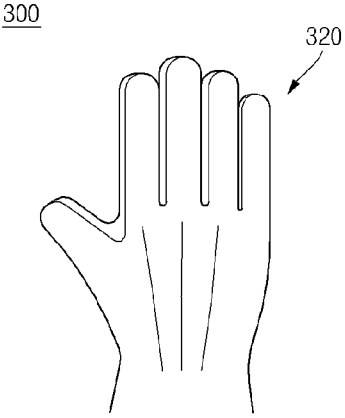
FIG. 10 illustrates a heating element of a heating apparatus according to another embodiment of the present invention.

FIG. 9 illustrates an induction patch of a heating apparatus according to still another embodiment of the present invention, and FIG. 10 illustrates a heating element of a heating apparatus according to another embodiment of the present invention.

Referring to FIGS. 9 and 10, the heating apparatus 300 according to still another embodiment of the present invention includes an induction patch 310 forming handles of a bicycle, and a heating element 320 forming gloves. The heating apparatus 300 may further include a temperature sensing unit (not shown), and a controller (not shown).

The induction patch 310 may be formed as handles of a bicycle. If a user wearing the glove-shaped heating element 320 holds the charging patch 310, the induction patch 310 charges the heating element 320 to allow the heating element 320 to generate heat. To this end, the charging patch 310 incorporates an internal coil and applies a current from an external or internal power supply to the internal coil to generate a magnetic field. In addition, the heating element 320 and the induction patch 310 perform non-contacting charging.

The heating element 320 is formed using conductive metal yarns and shaped of gloves. If a user wearing the glove-shaped heating element 320 in his/her hands holds the induction patch 310, the heating element 320 and the induction patch 310 perform non-contacting charging. In addition, the heating element 320 applies a current to the conductive metal yarns using the charged power and generates heat. Therefore, the heating element 320 applies the heat to the hands of the user wearing the heating element 320, thereby achieving hand warming.

Figure 11:
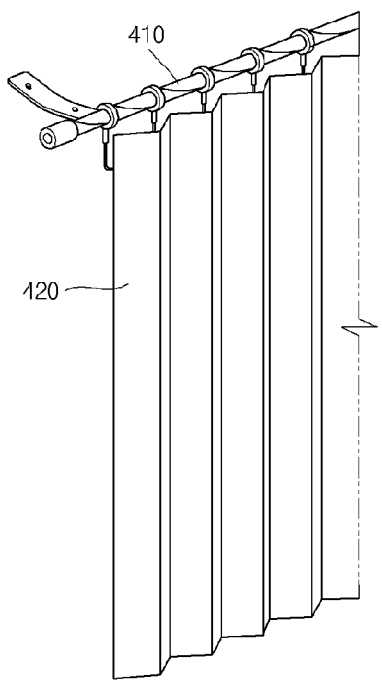
FIG. 11 illustrates an induction patch and a heating element of a heating apparatus according to another embodiment of the present invention.

FIG. 11 illustrates an induction patch and a heating element of a heating apparatus according to another embodiment of the present invention.

Referring to FIG. 11, the heating apparatus 400 according to another embodiment of the present invention includes an induction patch 410 and a heating element 420. The heating apparatus 400 may further include a temperature sensing unit (not shown) and a controller (not shown).

The induction patch 410 may be formed as a curtain rod. When the heating element 420 moves to the center of the curtain rod, the induction patch 410 performs non-contacting charging on the heating element 420. To this end, the induction patch 410 incorporates an internal coil. Thus, if a curtain having the heating element 420 is drawn to shield the sun light, that is to say, if the heating element 420 moves to the center of the induction patch 410 along the curtain rod, the induction patch 410 applies a current to the internal coil. Thus, a magnetic field is generated from the induction patch 410, and the heating element 420 performs non-contacting charging using the induction patch 410.

The heating element 420 is formed into a curtain by weaving conductive metal yarns. When the curtain having the heating element 420 is drawn, the heating element 420 performs non-contacting charging using the magnetic field generated from the induction patch 410. In addition, the heating element 420 applies a current to the conductive metal yarns using charged power and generates heat. In addition, when the curtain formed using the heating element 420 is drawn, the heating element 420 is separated from the induction patch 410 so as not to perform non-contacting charging, thereby preventing the heating element 420 from generating heat.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

INDUSTRIAL APPLICABILITY

As described above, since the heating apparatus according to the present invention includes an induction patch and a heating element formed using conductive metal yarns, the heating element can be charged by the induction patch in a non-contacting manner, thereby increasing user's convenience.

In addition, since the heating apparatus according to the present invention, heat is generated by the conductive metal yarns in the heating element using charged power, thereby allowing the heating element to easily transfer the heat to a user.

What is claimed is:

1. A heating apparatus comprising:
an induction patch generating a magnetic field when a current flows in an internal coil; and
a heating element receiving the magnetic field from the induction patch to perform non-contacting charging and having conductive metal yarns generating heat using charged power,
wherein the conductive metal yarns are woven within the heating element with a fabric,
wherein the conductive metal yarns include a plurality of metal parts centrally positioned, a coating part surrounding the metal parts, and a void created between the metal parts and the coating part.

2. The heating apparatus of claim 1, wherein the induction patch receives power from a battery and applies a current to the internal coil.

3. The heating apparatus of claim 2, wherein one end of each of the conductive metal yarns is in the form of a coil to receive the magnetic force from the induction patch.

4. The heating apparatus of claim 3, further comprising a variable resistor provided within the heating element, and a controller controlling an amount of the current flowing in the digital yarns by adjusting the size of the variable resistor.

5. The heating apparatus of claim 2, further comprising a variable resistor provided within the heating element, and a controller controlling an amount of the current flowing in the digital yarns by adjusting the size of the variable resistor.

6. The heating apparatus of claim 1, wherein one end of each of the conductive metal yarns is in the form of a coil to receive the magnetic field from the induction patch.

7. The heating apparatus of claim 1, wherein the conductive metal yarns form part of at least one of warps and wefts for weaving the heating element.

8. The heating apparatus of claim 1, wherein the induction patch forms a saddle of a motorcycle and the heating element is woven to produce motorcycle rider's clothes.

9. The heating apparatus of claim 1, wherein the induction patch forms a chair and the heating element is woven to produce a chair user's clothes.

10. The heating apparatus of claim 1, wherein the induction patch forms handles of a bicycle and the heating element is woven to produce bicycle rider's gloves.

11. The heating apparatus of claim 1, wherein the induction patch forms a curtain rod and the heating element is woven to produce a curtain.

12. The heating apparatus of claim 1, further comprising a temperature sensing unit attached to a surface of the heating element and having a bimetal or thermistor for sensing the temperature of the heating element.

13. The heating apparatus of claim 1, further comprising a variable resistor provided within the heating element, and a controller controlling an amount of the current flowing in the digital yarns by adjusting the size of the variable resistor.

14. The heating apparatus of claim 1, wherein the conductive metal yarns further include cover yarn surrounding the outer circumferential surface of the coating part.

15. The heating apparatus of claim 14, wherein the coating part comprises a material selected from the group consisting of ethylenetetrafluoroethylene (ETFE), fluorinated ethylenepropylene (FEP), polytetrafluoroethylene (PTFE), polyvinylidenefluoride (PVDF), and perfluoroalkoxy (PFA).

16. The heating apparatus of claim 14, further comprising a variable resistor provided within the heating element, and a controller controlling an amount of the current flowing in the digital yarns by adjusting the size of the variable resistor.

17. The heating apparatus of claim 1, wherein the coating part comprises a material selected from the group consisting of ethylenetetrafluoroethylene (ETFE), fluorinated ethylenepropylene (FEP), polytetrafluoroethylene (PTFE), polyvinylidenefluoride (PVDF), and perfluoroalkoxy (PFA).

18. The heating apparatus of claim 17, further comprising a variable resistor provided within the heating element, and a controller controlling an amount of the current flowing in the digital yarns by adjusting the size of the variable resistor.

\* \* \* \* \*